US011333620B2

(12) United States Patent
Agyeman-Budu et al.

(10) Patent No.: US 11,333,620 B2
(45) Date of Patent: May 17, 2022

(54) HIGH-PASS X-RAY FILTER DEVICE AND METHODS OF MAKING THEREOF

(71) Applicant: Cornell University, Ithaca, NY (US)

(72) Inventors: David N. Agyeman-Budu, Ithaca, NY (US); Joel D. Brock, Ithaca, NY (US); Arthur R. Woll, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 16/983,887

(22) Filed: Aug. 3, 2020

(65) Prior Publication Data
US 2021/0033544 A1    Feb. 4, 2021

Related U.S. Application Data

(60) Provisional application No. 62/882,259, filed on Aug. 2, 2019.

(51) Int. Cl.
*G01N 23/087* (2018.01)
*G01N 23/046* (2018.01)

(52) U.S. Cl.
CPC ......... *G01N 23/087* (2013.01); *G01N 23/046* (2013.01); *G01N 2223/423* (2013.01)

(58) Field of Classification Search
CPC ............... G01N 23/087; G01N 23/046; G01N 2223/423; G21K 2201/067; G21K 1/067; G21K 1/10; A61B 6/4035; A61B 6/482; A61B 6/583; G06T 2207/10116
See application file for complete search history.

(56) References Cited

U.S. PATENT DOCUMENTS

| 4,870,648 | A | * | 9/1989 | Ceglio | .................. B82Y 10/00 372/5 |
| 5,125,014 | A | | 6/1992 | Watanabe et al. | |
| 5,222,112 | A | | 6/1993 | Terasawa et al. | |
| 5,335,259 | A | | 8/1994 | Hayashida et al. | |
| 7,443,956 | B2 | | 10/2008 | Loewen et al. | |

OTHER PUBLICATIONS

Lairson and Bilderback, "Transmission X-Ray Mirror—A New Optical Element," Nuclear Instruments and Methods, 195:79-83 (1982).

* cited by examiner

*Primary Examiner* — Courtney D Thomas
(74) *Attorney, Agent, or Firm* — Troutman Pepper Hamilton Sanders LLP (Rochester)

(57) ABSTRACT

A high-pass x-ray filter device is disclosed that includes a substrate defining an elongated opening. A reflecting membrane is positioned across the opening and supported, along all sides, by the substrate. The reflecting membrane is configured to transmit, from an incident x-ray beam, x-ray photons having an energy above about a threshold energy level and reflects, from the incident x-ray beam, x-ray photons having an energy below about the threshold energy level. The elongated opening of the substrate defines an exit path for the transmitted x-ray beam. A high-pass x-ray filter system including the high-pass filter device and a method of fabrication of the high-pass filter device are also disclosed.

24 Claims, 13 Drawing Sheets

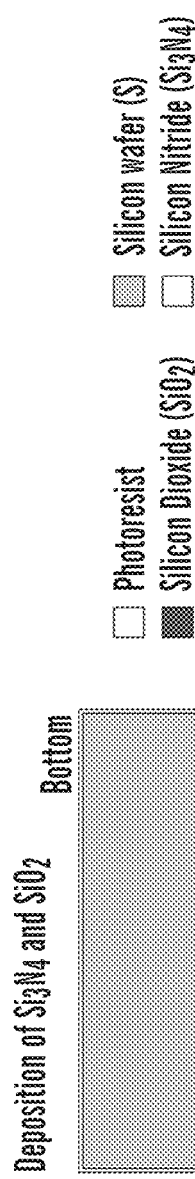
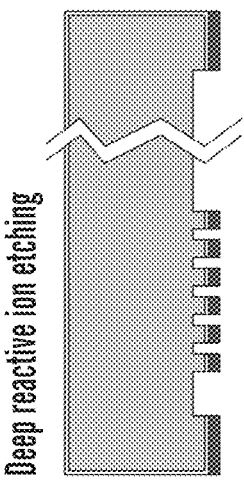
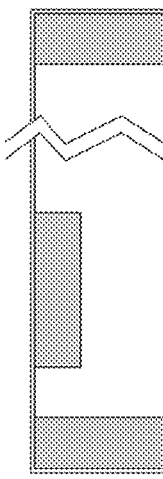
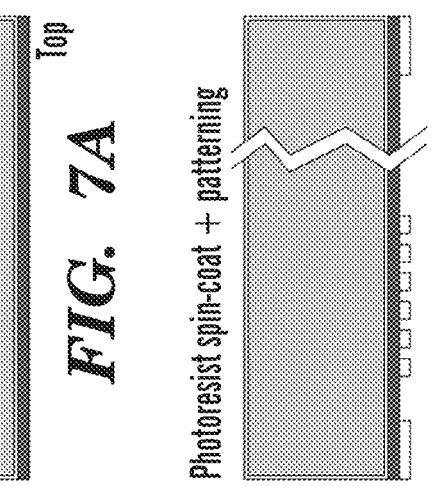
FIG. 7A — Deposition of Si3N4 and SiO2
FIG. 7B — Photoresist spin-coat + patterning
FIG. 7C — Patterning hard etch mask
FIG. 7D — Etch step 1: Anisotropic dry etch, Deep reactive ion etching
FIG. 7E — Aspect ratio dependent etching
FIG. 7F — Etch step 2: Clearance etch, Lateral etching
FIG. 7G — Finished device
Legend: Photoresist, Silicon wafer (S), Silicon Dioxide (SiO2), Silicon Nitride (Si3N4)

US 11,333,620 B2

HIGH-PASS X-RAY FILTER DEVICE AND METHODS OF MAKING THEREOF

This application claims the benefit of U.S. Provisional Patent Application Ser. No. 62/882,259, filed Aug. 2, 2019, which is hereby incorporated by reference in its entirety.

GOVERNMENT FUNDING

This invention was made with Government support under Grant Numbers NNCI-1542081 and DMR-1332208 awarded by the National Science Foundation. The United States Government has certain rights in the invention.

FIELD

The present application relates to a high-pass x-ray filter device and methods of making thereof.

BACKGROUND

X-ray transmission mirror (XTM) optics are high selectivity, high-pass x-ray filters. The criteria defining selectivity are: (1) the order-of-magnitude reduction of x-ray photons below a particular critical energy threshold that get removed from a white x-ray beam; and (2) the sharpness of the energy cut-off at the critical energy threshold, which is characterized by the rapid transition from no transmission to the maximum allowable x-ray transmission across the energy spectrum. XTMs advantageously provide a sharper energy cut-off than absorption filters Although the concept, first demonstration, and potential applications of XTMs were initially described over 30 years ago, only a few implementations exist in the literature. This is attributed to the unsolved challenge of a thick frame supporting a thin, reflecting membrane that does not itself block the transmitted beam. More specifically, the extreme geometry of the XTM optic requires a stable support. In particular, the XTM optic requires a long beam footprint mirror due to the required grazing incident angle. Additionally, the XTM optic must be sufficiently thin to minimize absorption of the transmitted beam, have an appropriately figured surface, and be flat. Prior XTM optics fail to provide all of these features, and also suffer issues related to yield.

The present technology is directed to overcoming these and other deficiencies in the art.

SUMMARY

One aspect of the present technology relates to a high-pass x-ray filter. The high-pass x-ray filter includes a substrate defining an elongated opening. A reflecting membrane is positioned across the opening and supported, along all sides, by the substrate. The reflecting membrane is configured to transmit, from an incident x-ray beam, x-ray photons having an energy above about a threshold energy level and reflects, from the incident x-ray beam, x-ray photons having an energy below about the threshold energy level. The elongated opening of the substrate defines an exit path for the transmitted x-ray beam.

Another aspect of the present application relates to a high-pass x-ray filter system. The high-pass x-ray filter system includes a synchrotron source configured to generate an x-ray beam and an x-ray filter. The x-ray filter includes a substrate defining an elongated opening. A reflecting membrane is positioned across the opening so as to be supported along all sides by the substrate. The reflecting membrane is configured to transmit, from an incident x-ray beam of the synchrotron source, x-ray photons having an energy above about a threshold energy level and to reflect, from the incident x-ray beam, x-ray photons having an energy below about the threshold energy level, the elongated opening of the substrate defining an exit path for the transmitted x-ray beam.

The high-pass x-ray filter device of the present application provides an XTM optic that is formed by employing silicon microfabrication. A robust XTM frame is fabricated using a two-step etch process, which secures the thin-film membrane without blocking the transmitted beam. Further, the high-pass x-ray filter can be fabricated with a 90% yield, and provide a more efficient high-pass X-ray filter.

BRIEF DESCRIPTION OF THE DRAWINGS

FIGS. 7A-7G illustrates the steps in a method of fabrication of the high-pass x-ray filter device.

DETAILED DESCRIPTION

The present application relates to a high-pass x-ray filter device. More specifically, the present application relates to a highly selective, tunable high-pass x-ray filter device, systems including the high-pass x-ray filter device, and methods of making thereof.

One aspect of the present technology relates to a high-pass x-ray filter. The high-pass x-ray filter includes a substrate defining an elongated opening. A reflecting membrane is positioned across the opening and supported, along all sides, by the substrate. The reflecting membrane is configured to transmit, from an incident x-ray beam, x-ray photons having an energy above about a threshold energy level and reflects, from the incident x-ray beam, x-ray photons having an energy below about the threshold energy level. The elongated opening of the substrate defines an exit path for the transmitted x-ray beam.

Figure 1:
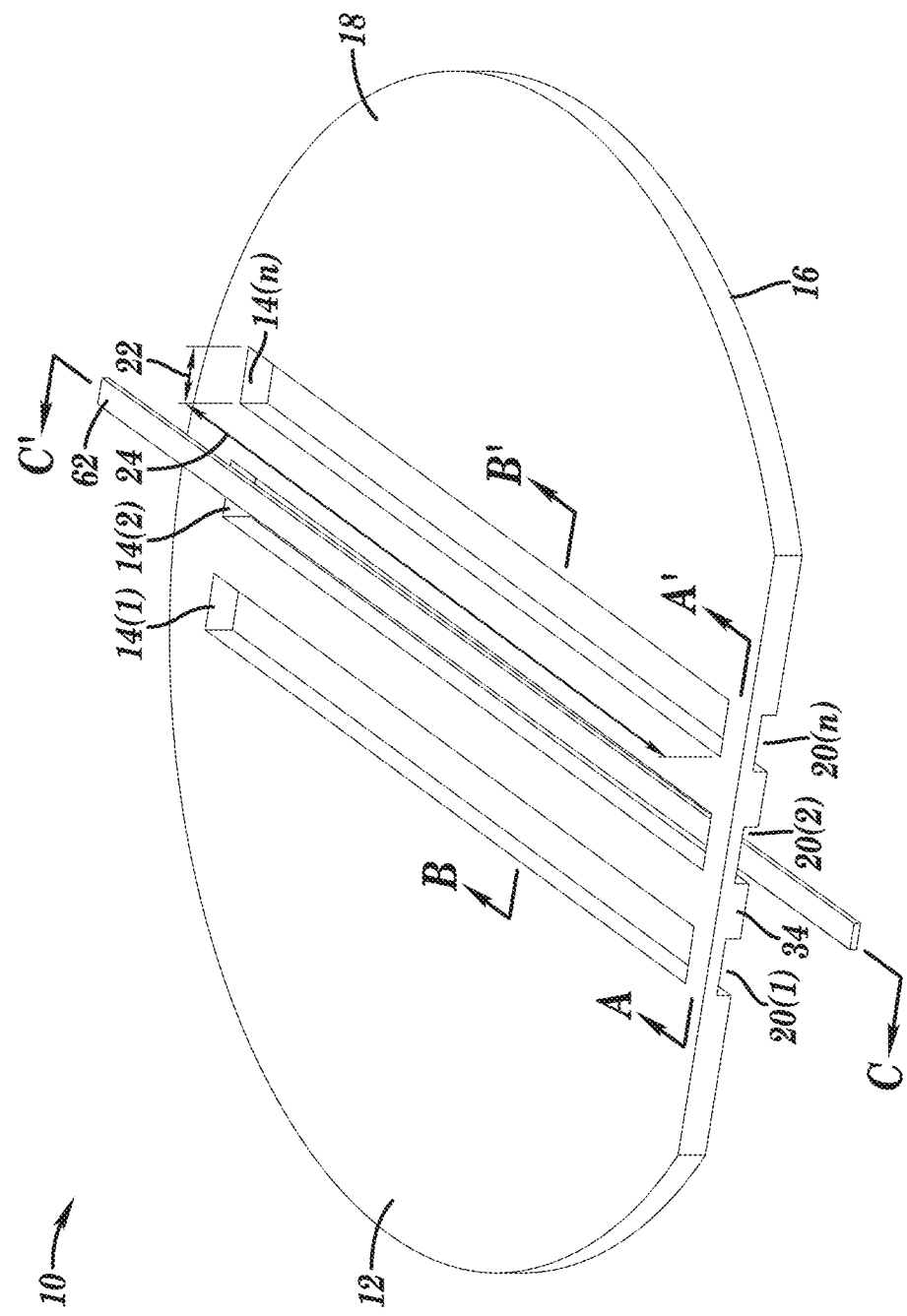
FIG. 1 is a perspective view of a high-pass x-ray filter device of the present application.
Figure 2:
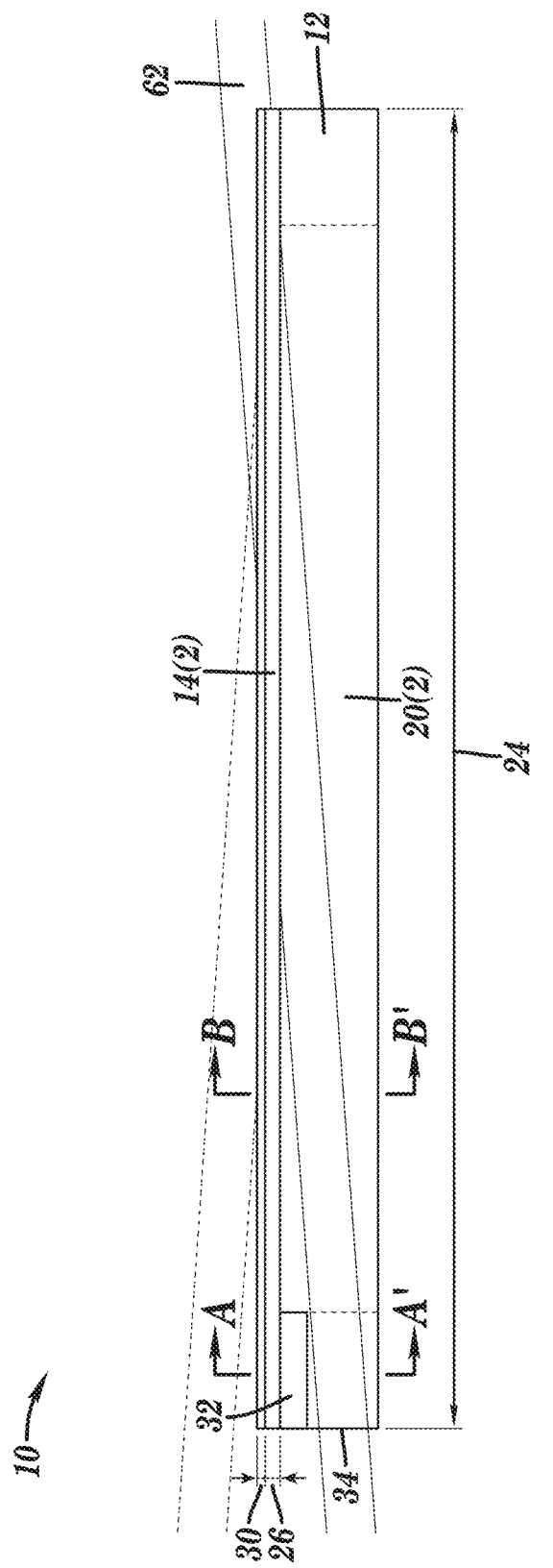
FIG. 2 is a side cross-sectional view of the high-pass x-ray filter device of the present application.

FIGS. 1 and 2 are a perspective view and a side cross-sectional view, respectively of a first embodiment of a high-pass x-ray filter device 10 of the present application. High-pass x-ray filter device 10 includes substrate 12 and reflecting membranes 14(1)-14(n), although high-pass x-ray filter device 10 may include other types and or numbers of elements or components, including other numbers of reflecting membranes, in other combinations. High-pass x-ray filter device 10 provides a number of advantages including providing a highly selective x-ray filter that transmits high-energy photons in a broad spectrum, white x-ray beam, while filtering out low energy x-ray beams. The overall structure of the device includes a thin membrane that supported on all sides by a substrate support that is defined by an etched-out window in a substrate. The high-pass x-ray filter device 10 provides: (1) total external reflection of x-rays at the mirror surface, which reflects and removes all x-ray photons with energies below the critical angle of incidence from the incident broadband x-ray spectrum; and (2) a sufficiently thin reflecting membrane to transmit the high energy x-ray photons which do not get reflected with minimal absorption. The high-pass x-ray filter device 10 can be utilized in synchrotrons as a high-pass filter for selecting higher energy harmonics from an undulator spectrum in a beamline. The high-pass x-ray filter device 10 can also be used in conjunction with a total reflecting mirror to create a broadband optic setup for white beam diffraction experiments. The high-pass x-ray filter could also be employed as a high heat load filter.

Referring again to FIGS. 1 and 2, substrate 12 is a silicon wafer having first side 16 and second side 18. Substrate 12 defines elongated openings 20(1)-20(n) located therein. Although three elongated openings are illustrated in FIG. 1, any number of elongated openings may be defined by substrate 14. Each of elongated openings 20(1)-20(m) has a width 22 and a length 24. In one embodiment, each of elongated openings 20(1)-20(m) has width 22 between about 0.5 mm to about 10 mm. In another embodiment, each of elongated openings 20(1)-20(m) has width 22 between about 1.0 mm to about 2.0 mm. In one embodiment, each of elongated openings 20(1)-20(n) has length 24 between about 70 mm to about 300 mm. In another embodiment, each of elongated openings 20(1)-20(n) has length 24 between about 250 mm to about 300 mm. In one embodiment, elongated openings 20(1)-20(n) are etched into first side 16 of substrate 12, as described below.

Figure 6:
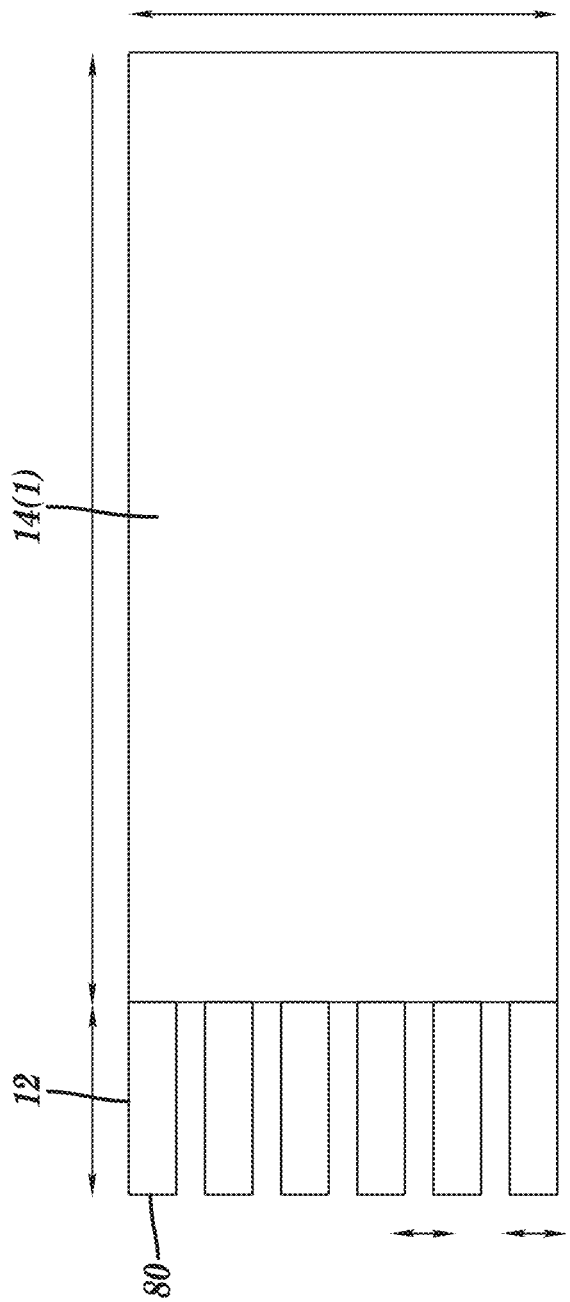
FIG. 6 is a schematic view of an optic of the high-pass x-ray filter device.

FIG. 6 illustrates a top view of elongated opening 20(1) of high-pass x-ray filter device 10 in the substrate. Pillars 80 are also etched on the backside of substrate 12. The densely spaced pillars 80 are placed at the exit of elongated opening 20(1) in order to etch slower in comparison to the wide-open window pattern of elongated opening 20(1) to generate a monolithic support structure. Pillars 80 have width dimensions that range between about 1 μm to about 50 μm and may be formed in any combination thereof. Pillars 80 have a length that ranges from about 0.5 mm to about 10 mm.

Referring again to FIGS. 1 and 2, reflecting membranes 14(1)-14(n) are a thin film formed on, or a plurality of separate thin films formed on, at least second side 18 of substrate 12. Reflecting membranes 14(1)-14(n) are positioned across elongated openings 20(1)-20(m), respectively, such that each of reflecting membranes 14(1)-14(n) are supported, along all sides, by substrate 12. Elongated openings 20(1)-20(n) provide windows in substrate 12 from first side 16 to reflecting members 14(1)-14(n), respectively, formed on second side 18 of substrate 12.

In one example, reflecting membranes 14(1)-14(n) are formed from a Si$_3$N$_4$ layer deposited on substrate 12, although reflecting membranes 14(1)-14(n) may be formed from other materials, such as polymethyl methacrylate (PMMA), SU-8, Parylene C or a poly(p-xylylene) polymer.

In another embodiment, reflecting membranes 14(1)-14(n) are composite structures. In yet another embodiment, each of reflecting membranes 14(1)-14(n) is formed from a different material. Each of reflecting members 14(1)-14(n) has a thickness 26 between about 10 nm to about 600 nm. In another embodiment, each of reflecting members 14(1)-14(n) has thickness 26 between about 200 nm to about 400 nm.

Figure 12:
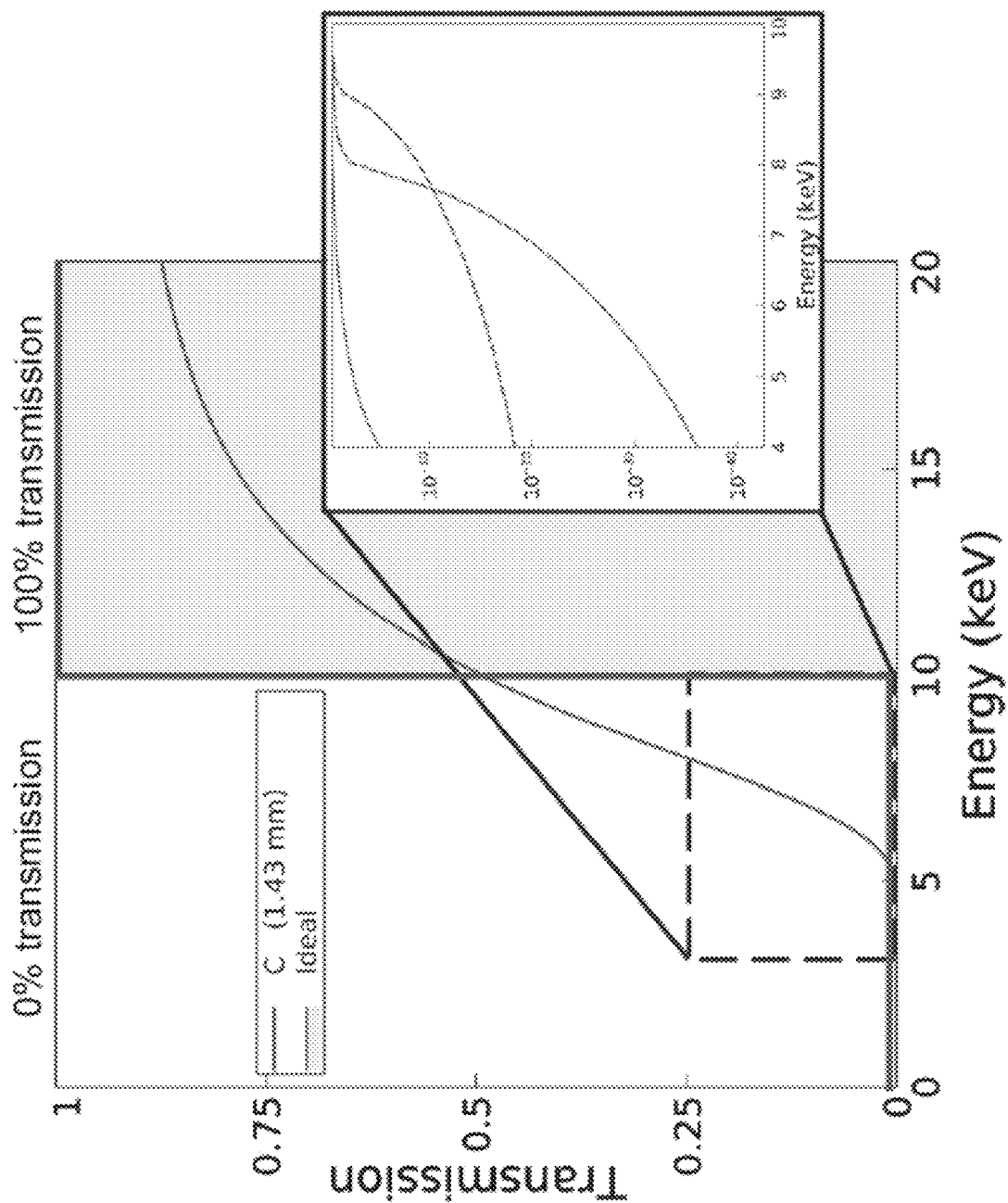
FIG. 12 is an graph of transmission versus energy for a high-pass x-ray filter device.

As shown in FIG. 2, reflecting membranes 14(1)-14(n) can optionally have an additional film coating 28 located thereon. In one example, additional film coating 28 is a metal coating having thickness 30 of about 10 nm, although other additional coatings have other thickness may be employed. Additional film coating, such as a metal coating, can be deposited on to one or more of the reflecting membranes 14(1)-14(n) of the as fabricated high-pass x-ray device 10 to modify the reflecting properties. In one embodiment, the additional film coating 28 has a higher operating angle (>0.3°), which relaxes some of the taxing operating constraints on the high-pass x-ray filter device, such that the entire footprint of the beam is smaller and thus, easier to operate. Reflecting membranes 14(1)-14(n) are configured to transmit, from an incident x-ray beam, x-ray photons having an energy above about a threshold energy level and reflect, from the incident x-ray beam, x-ray photons having an energy below about the threshold energy level. An example transmission spectrum for high-pass x-ray filter device 10 is illustrated in FIG. 12. The elongated opening of the substrate defines an exit path for the transmitted x-ray beam.

As described in further detail below, reflecting members 14(1)-14(n), during use, are each configured to transmit, from an incident x-ray beam, x-ray photons having an energy above about a threshold energy level. Reflecting members 14(1)-14(n) are also configured to reflect, from the incident x-ray beam, x-ray photons having an energy below about the threshold energy level. Elongated openings 20(1)-20(2) of substrate 12 define an exit path for the transmitted x-ray beam. Substrate 12 includes thinned portion 32 at exit surface 34 to allow the transmitted x-ray beam to exit high-pass x-ray filter device 10. Thinned portion 32 prevents substrate from blocking a grazing exit beam so that the transmitted beam is unobstructed, as discussed in further detail below, while also providing sufficient structural support for reflecting members 14(1)-14(n).

Another aspect of the present application relates to a high-pass x-ray filter system. The high-pass x-ray filter system includes a synchrotron source configured to generate an x-ray beam and an x-ray filter. The x-ray filter includes a substrate defining an elongated opening. A reflecting membrane is positioned across the opening so as to be supported along all sides by the substrate. The reflecting membrane is configured to transmit, from an incident x-ray beam of the synchrotron source, x-ray photons having an energy above about a threshold energy level and to reflect, from the incident x-ray beam, x-ray photons having an energy below about the threshold energy level, the elongated opening of the substrate defining an exit path for the transmitted x-ray beam.

Figure 3:
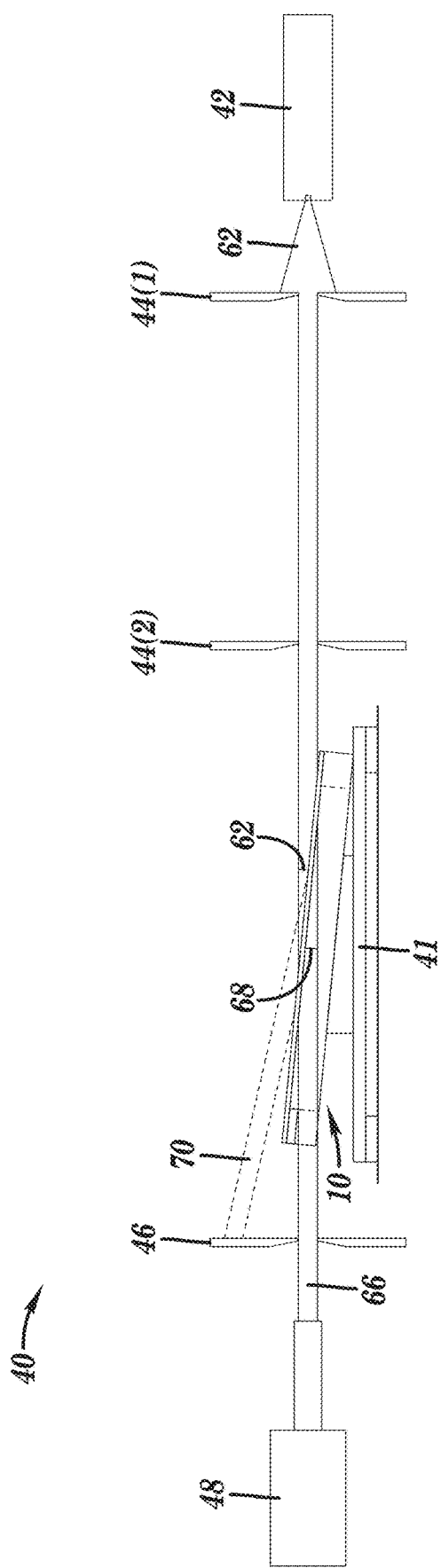
FIG. 3 is a schematic of a high-pass x-ray filter system including the high-pass x-ray filter device and an x-ray source.

FIG. 3 illustrates high-pass x-ray filter system 40 in an experimental setup including high-pass x-ray filter device 10, rotation and translation stage 41, x-ray source 42, beam defining slits 44(1) and 44(2), beam selection slits 46, and x-ray detector 48, although high-pass x-ray filter system 40 may include other components, such as additional optics, in other configurations.

Figure 4:
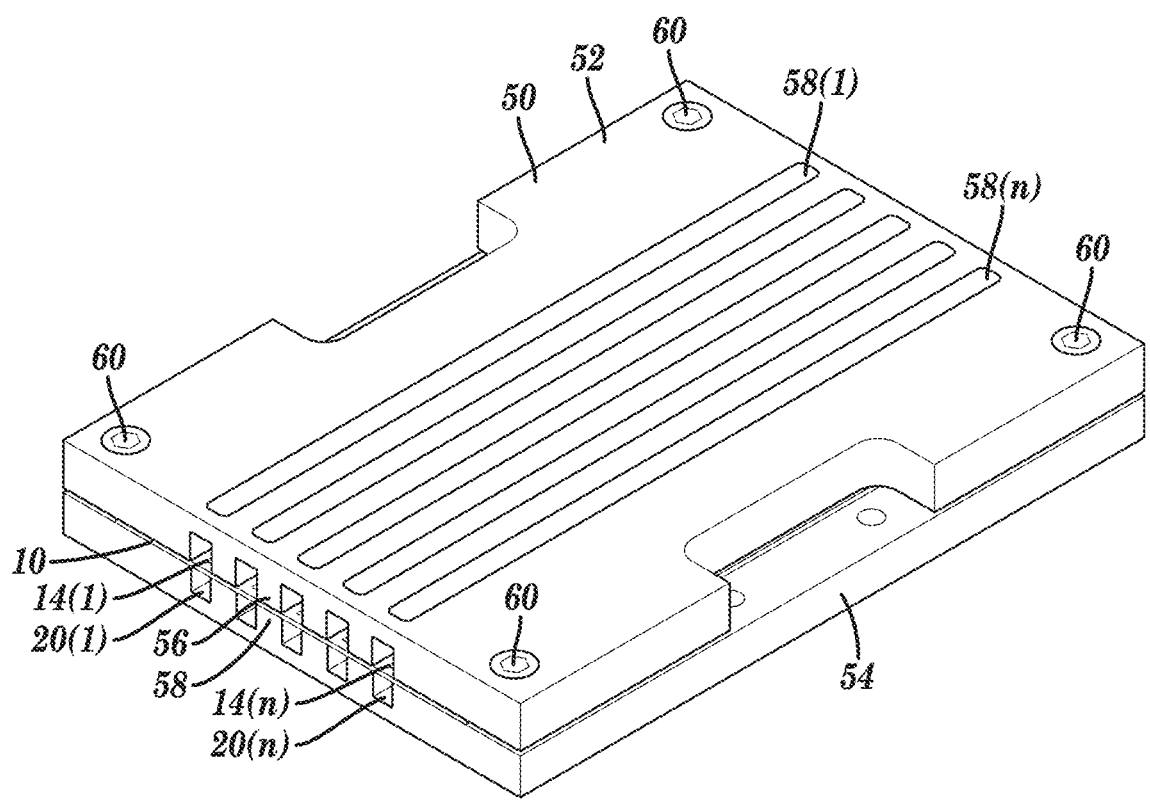
FIG. 4 is a perspective view of the high-pass x-ray filter device in a holder.
Figure 5:
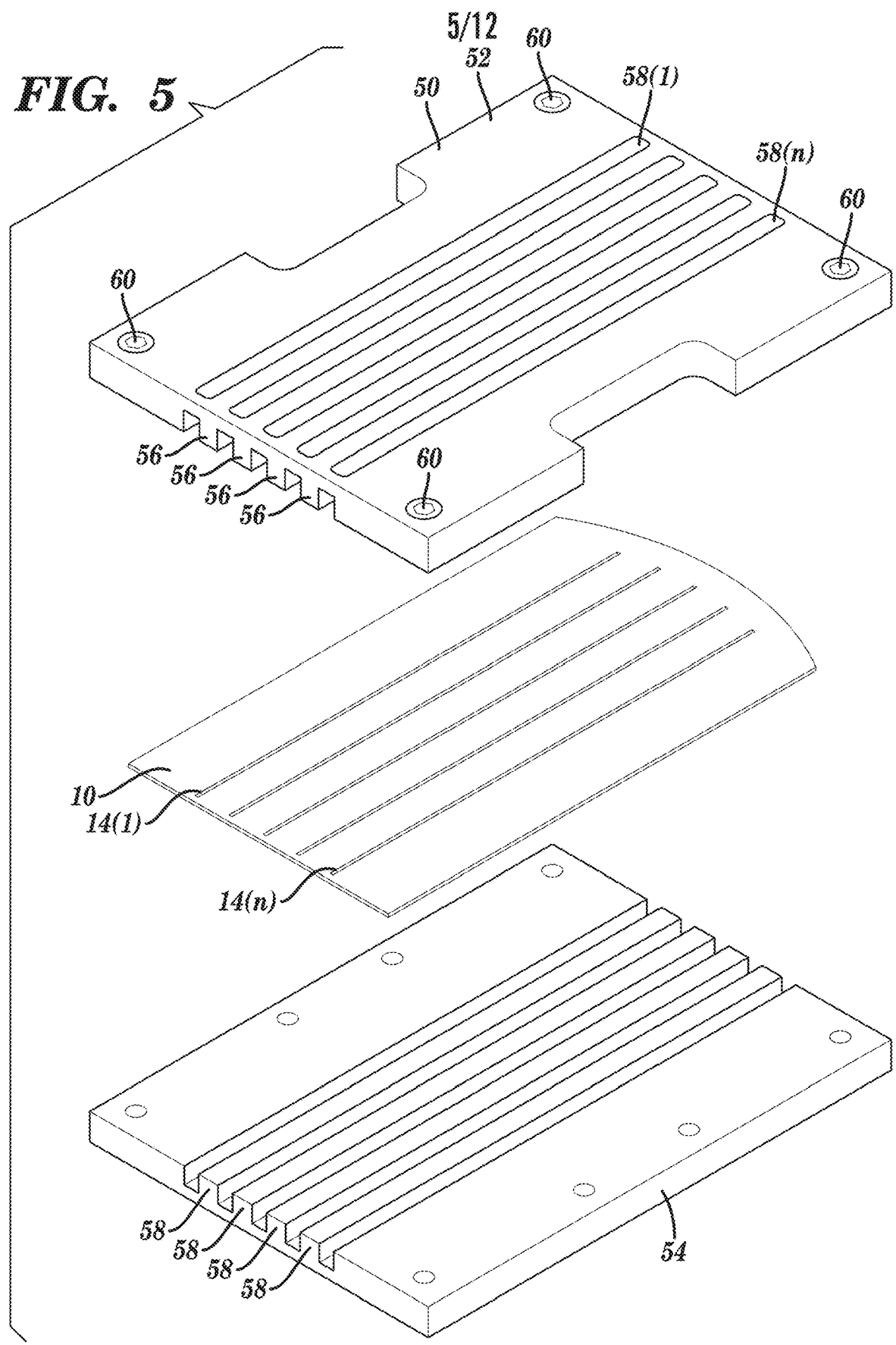
FIG. 5 is an exploded perspective view of the high-pass x-ray filter device and the holder.

Referring now to FIGS. 4 and 5, during use, high-pass x-ray filter device 10 is positioned in holder 50 including top portion 52 and bottom portion 54 that serves as a clamp for holding high-pass x-ray filter device 10 during use. Holder 50 also serves as a heat sink when cooled down to extract and conduct away the heat absorbed from radiation. Holder 50 is formed from aluminum, although other materials may be employed. Top portion 52 and bottom portion 54 have corresponding teeth 56 and 58. High-pass x-ray filter device 10 is sandwiched between top portion 52 and bottom portion 54 of holder 50 with teeth 56 and 58 in contact with substrate 12. Elongated openings 20(1)-20(n) with reflecting members 14(1)-14(n) are aligned between teeth 56, 58. Top portion 52 includes slots 58(1)-58(n) to allow optical access to the reflecting members 14(1)-14(n). Top portion 52 can be coupled to bottom portion using screws 60. Holder 50 allows high-pass x-ray filter device 10 to be firmly held in place for mounting on rotation and translation stage 41. Bottom portion 54 of holder 50 is configured to be coupled to rotation and translation stage 41. Rotation and translation stage 41 can be used to align high-pass x-ray filter device 10 to x-ray source 42. In one embodiment, holder 50 can be utilized to provide an inert environment for high-pass x-ray filter device.

X-ray source 42 is configured to provide generate incident x-ray beam 62 that, during use, is incident on high-pass x-ray filter device. Incident x-ray beam 62 comprises a broadband x-ray spectrum. In one embodiment, x-ray source 42 is a synchrotron source that includes insertion device magnets, although other x-ray sources may be employed. The insertion device magnets can include an undulator and the x-ray beam generated by the undulator comprises a narrow-band fundamental harmonic and a series of higher energy harmonics.

Beam defining slits 44(1) and 44(2) are positioned to receive incident x-ray beam 62 from x-ray source 42 to define incident x-ray beam 62 for deliver to high-pass x-ray filter 10. High-pass x-ray filter 10 is positioned at incident grazing angle 64 to incident x-ray beam 62. Incident grazing angle 64 ranges from about zero degrees to about 0.5 degrees. Incident x-ray beam 62 is incident on reflecting membranes 14(1)-14(n) of high-pass x-ray filter device 10.

Reflecting membranes 14(1)-14(n) are configured to generate a transmitted beam 66 from incident x-ray beam 62 at exit grazing angle 68. Exit grazing angle 68 corresponds to incident grazing angle 64 and ranges from about zero degrees to about 0.5 degrees. Transmitted beam 68 includes x-ray photons having an energy above about a threshold energy level. Transmitted beam 68 is transmitted through exit surface 34 of high-pass x-ray filter device 10. Reflecting membranes 14(1)-14(n) are also configured to generate reflected beam 70 from incident x-ray beam 62. Reflecting membranes 14(1)-14(n) reflect x-ray photons with energies below a critical angle of incidence from incident x-ray beam 62. Reflected beam 70 includes x-ray photons having an energy below about the threshold energy level.

Transmitted beam 66 is incident on beam selection slits 46 which provide transmitted beam 66 to x-ray detector 48 in the experimental system setup. In one embodiment, x-ray detector 48 is an energy resolving x-ray detector such as a Vortex-EX detector, although high-pass x-ray filter 10 may be used in other applications with other devices.

EXAMPLES

Example 1—Exemplary Method of Fabrication

FIGS. 7A-7G illustrate one method of fabrication of high-pass x-ray filter device 10. The method of fabrication includes a two-step etch process that is used to create a support bridge for a thin reflecting membrane.

The method of fabrication for making a radiation-hard version of high-pass x-ray filter device 10 starts with a planar and mechanically stiff substrate, as shown in FIG. 7A. The substrate must have a smooth, polished surface finish on both sides with a typical surface roughness that range from about 1 Å to about 60 Å. In one embodiment, the substrate is a double-side chemo-mechanically polished silicon wafer having a thickness in the range from about 100 mm to about 300 mm. The substrate is coated with a conformal thin film with a thickness ranging between about 100 Å to about 100 000 Å. The thin film coating is applied to both sides of the substrate via low pressure chemical vapor deposition (LPCVD) of low-stress silicon nitride ($Si_3N_4$) in a furnace. One side of the substrate is chosen to be the backside (Top portion in FIG. 7A), which gets coated with another protective thin film to function as an etch mask. The etch mask can be a dielectric material such as silicon dioxide or aluminum dioxide, which can be deposited by either a plasma enhanced chemical vapor deposition process (PECVD), a sputter or evaporation deposition process, or an atomic layer deposition (ALD) process. The dielectric etch mask thickness can range from 0.5 µm to 5 µm and can be used with an optional layer of spin-coated or spray-on photoresist.

Next, as shown in FIG. 7B, the windows that define the structure of the mirror provided by high-pass x-ray device 10 is patterned onto the etch mask located on the backside of the wafer substrate using photolithography. Additionally, support structures made from densely spaced pillars are also lithographically patterned onto the backside of the substrate in the photoresist. The lithography pattern for the windows and pillars are transferred into the etch mask to expose the wafer substrate underneath.

The exposed wafer substrate is then etched in two separate steps from the backside. The first etch step, as illustrated in FIGS. 7D and 7E is an anisotropic deep reactive ion etch (DRIE), which etches vertically into the substrate with minimal lateral etching. The windows are elongated openings that are etched into the wafer substrate to a depth of about 300 µm or about ~¾ of the wafer thickness. The densely spaced pillar pattern is placed at the exit of the window to etch slower in comparison to the wide-open window pattern. Such configuration creates a monolithic support structure when a residual amount of the substrate is left after the etch. The shallow residual amount of the substrate becomes the structural support bridge and also provides the adequate clearance required for the grazing exit x-ray beam that get transmitted at the backside.

The second etch step, as illustrated in FIGS. 7F and 7G, is a clearing etch to remove the final ¼ of the residual silicon substrate left in the window pattern from the backside. This etch is accomplished by immersing the structure in a 40% potassium hydroxide (KOH) bath at 80° C. The KOH continues etching the substrate. Silicon nitride does not etch in KOH and is therefore not attacked. This etch step is complete when the thin film coating on the topside of the wafer is cleared of all the silicon substrate underneath, and the optics formed are completely freestanding silicon nitride membranes anchored onto the substrate at the edges only as shown in FIG. 7G. The second etch step also clears out remainder of the pillar pattern while leaving behind the shallow support bridge at the exit.

Example 2—Another Exemplary Method of Fabrication

Figure 8A:
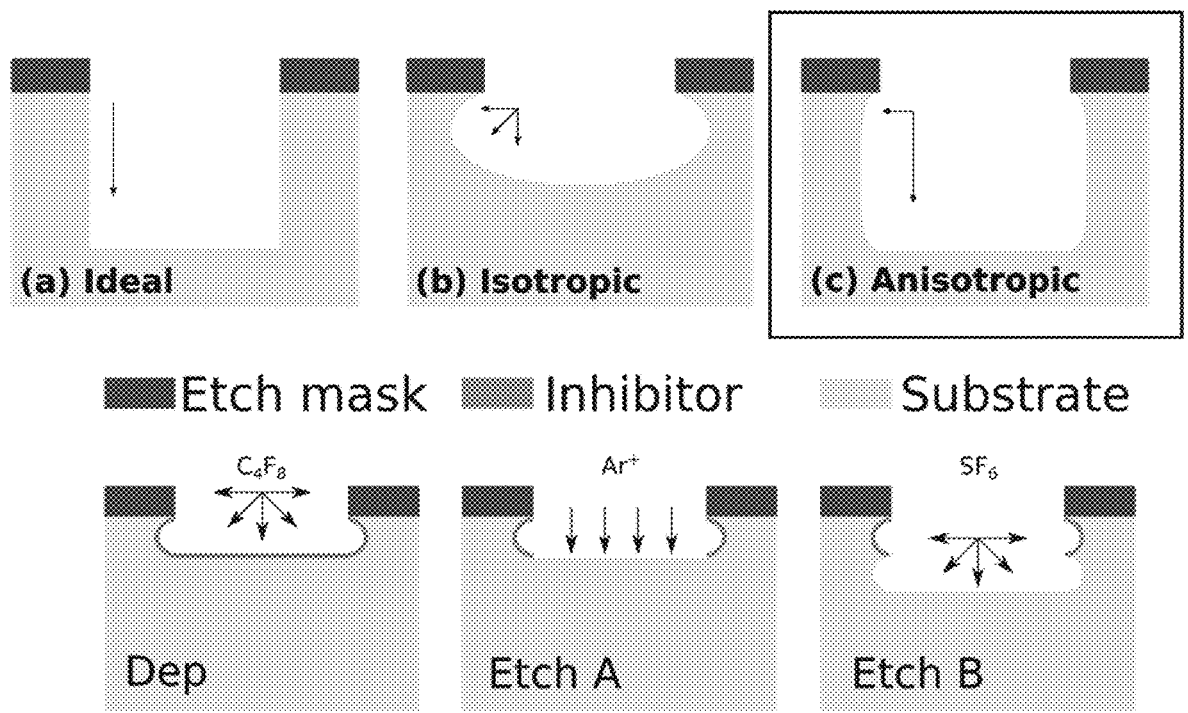
FIGS. 8A and 8B illustrate the steps in an alternate method of fabrication of the high-pass x-ray filter device.
Figure 8B:
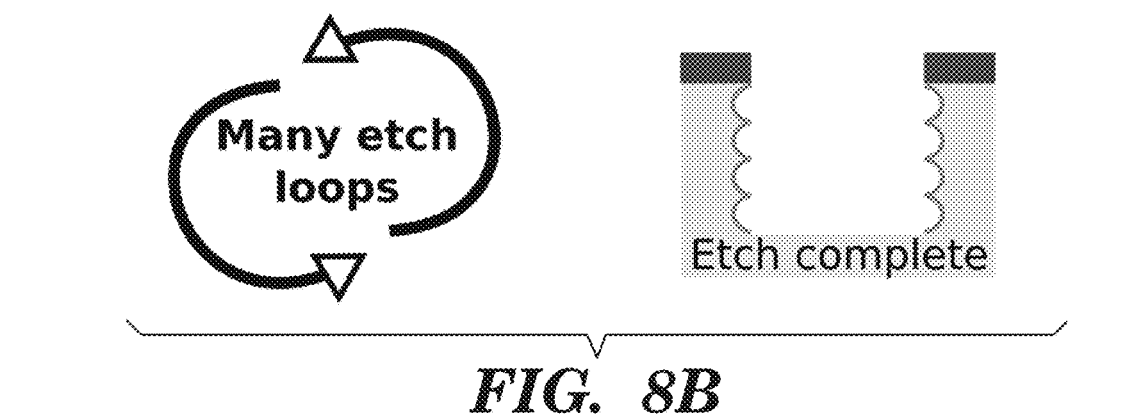

FIGS. 8A and 8B illustrate an alternative method of making high-pass x-ray filter device 10 also starts with a planar and mechanically stiff substrate with a smooth surface finish on both sides as described above. The substrate is a double-side polished silicon wafer.

The backside of the substrate is coated with a thin film material as an etch mask. The etch mask material can either be a thin film dielectric such as silicon oxide (about 1 μm-about 3 μm thick), aluminum oxide (about 0.5 μm-about 1 μm thick), or a metal like chromium (about 0.1 μm to about 0.5 μm thick). The method of deposition can be PECVD, ALD, sputtering or evaporation for the dielectric thin films or evaporation or sputtering for the metal chromium film.

The widows and the closely packed pillars are patterned on the backside using photolithography. Next, the lithography pattern is transferred into the etch mask by a dry etch process to expose the silicon underneath to define the geometrical features of the mirror and the closely packed pillar pattern. The substrate is etched anisotropically from the backside using the DRIE etch process. The deep etch step is stopped after ~¾ of the wafer thickness in the open area of the windows has been removed. The densely-packed pillars etch slowly and their effective shallow etch depth results in a stepped profile, which forms the basis of the monolithic support bridge.

The topside of the wafer is coated with a very thin film of organic material. This organic material can be spin coated in liquid form such as PMMA, SU-8, or evaporated onto the substrate like Parylene C. The organic thin film thickness can range between about 500 Å-about 3000 Å, and must be chemically inert to gases in the subsequent clearance etch step. The inert thin film polymer membrane is required to be pristine to maintain a smooth surface to reflect x-rays. SU-8 thin films need a blanket UV radiation exposure for 4-8 seconds under a 12.6 mW/cm2 lamp power to cure the film and to form a dense, cross-linked thin film, which is mechanically stronger.

The second etch step is a clearance etch. The etch removes the residual silicon left in the window structure and simultaneously remove the pillars via a lateral isotropic etch. This process is accomplished with a non-plasma isotropic etch. Gaseous xenon difluoride ($XeF_2$) is used to etch the silicon substrate. As the silicon is cleared from the windows, the pillar structures are also laterally etched. The etch is complete when the organic polymer windows are cleared from any residual silicon or substrate material and the membrane is freestanding and only anchored to the substrate at the edges.

Example 3—Experimental Results

Figure 9A:
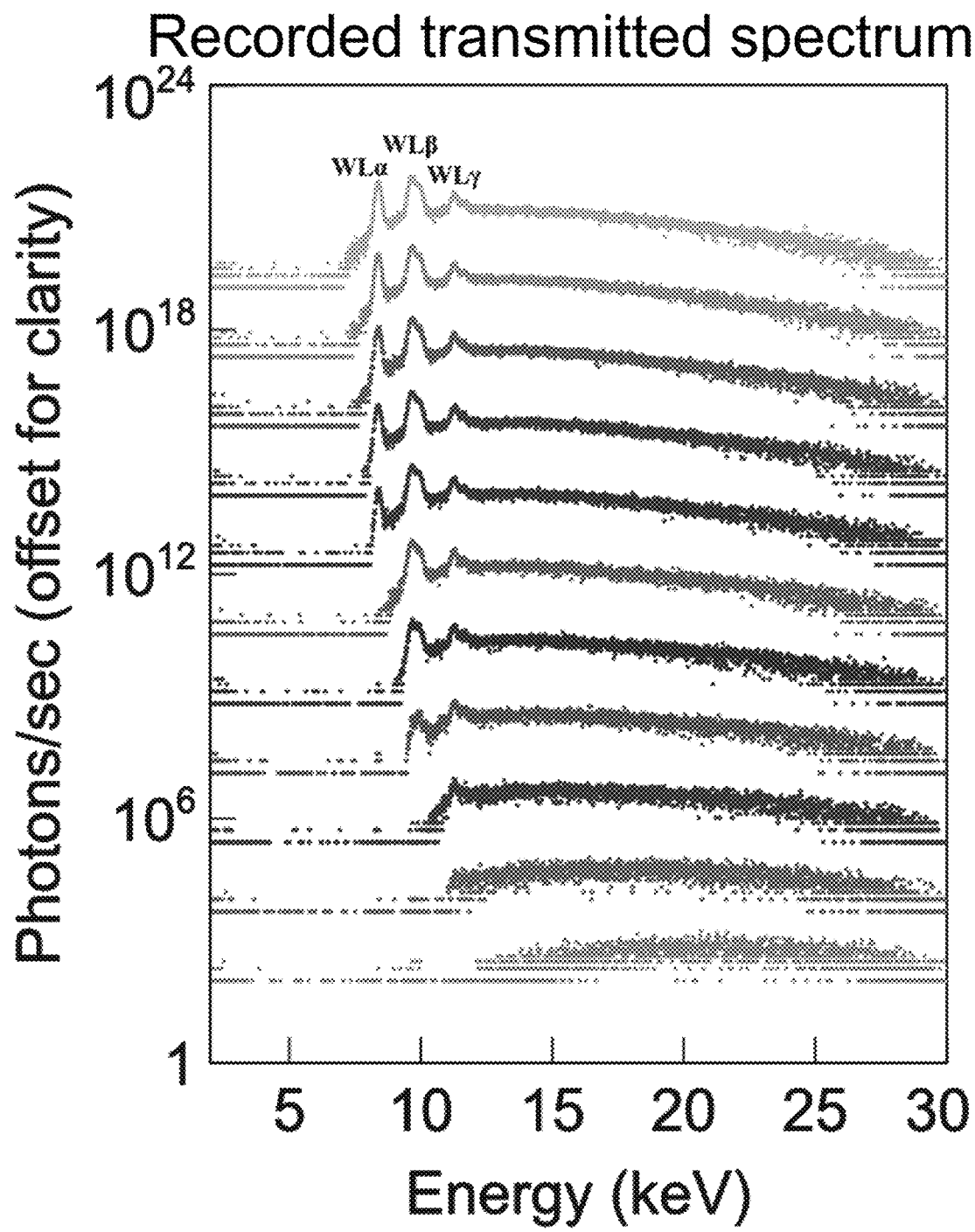
FIG. 9A illustrates the spectral response of the x-ray filter.
Figure 9B:
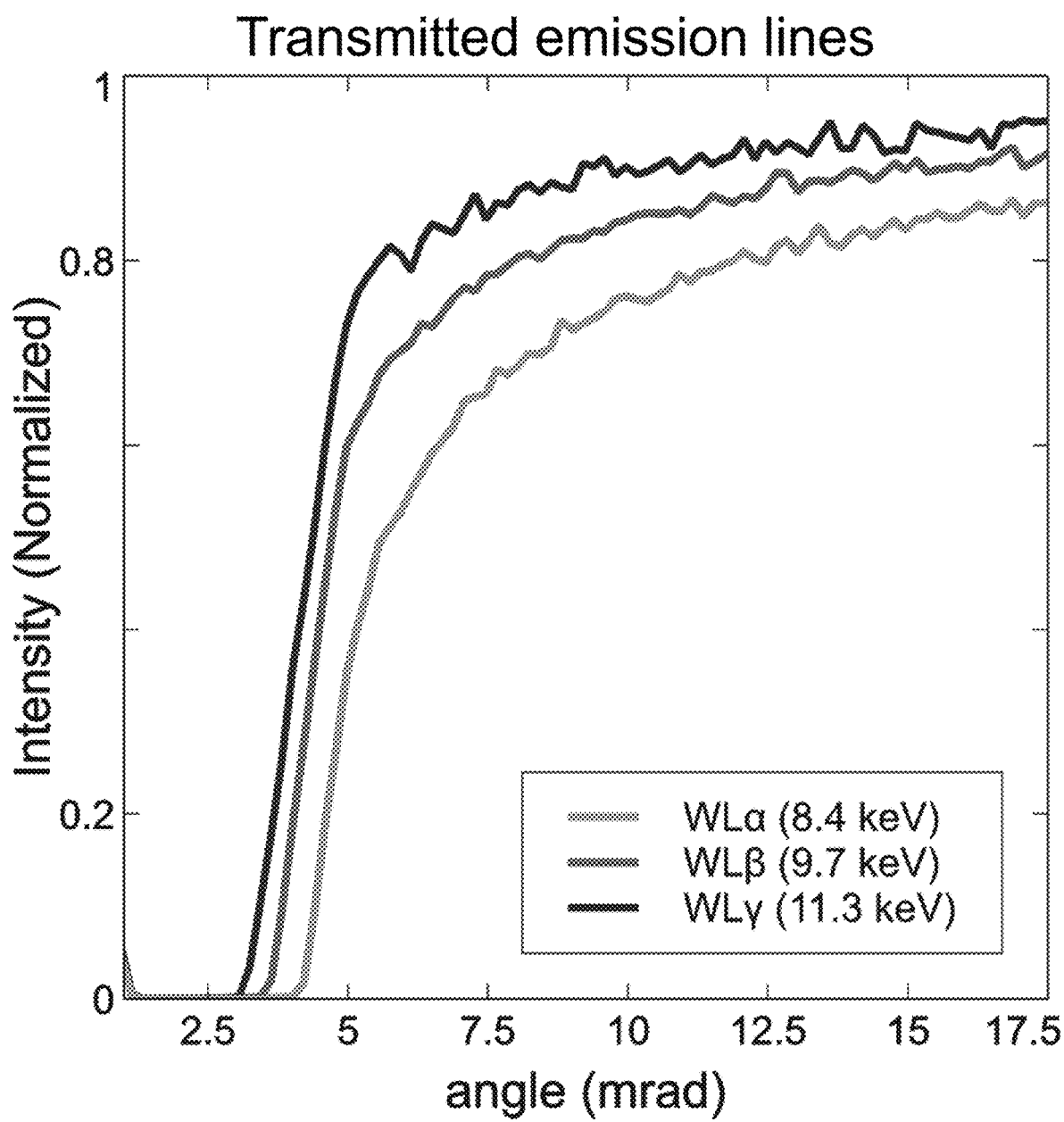
FIG. 9B is a graph of intensity for the transmitted emissions from the x-ray filter versus the angle of the optics.
Figure 10:
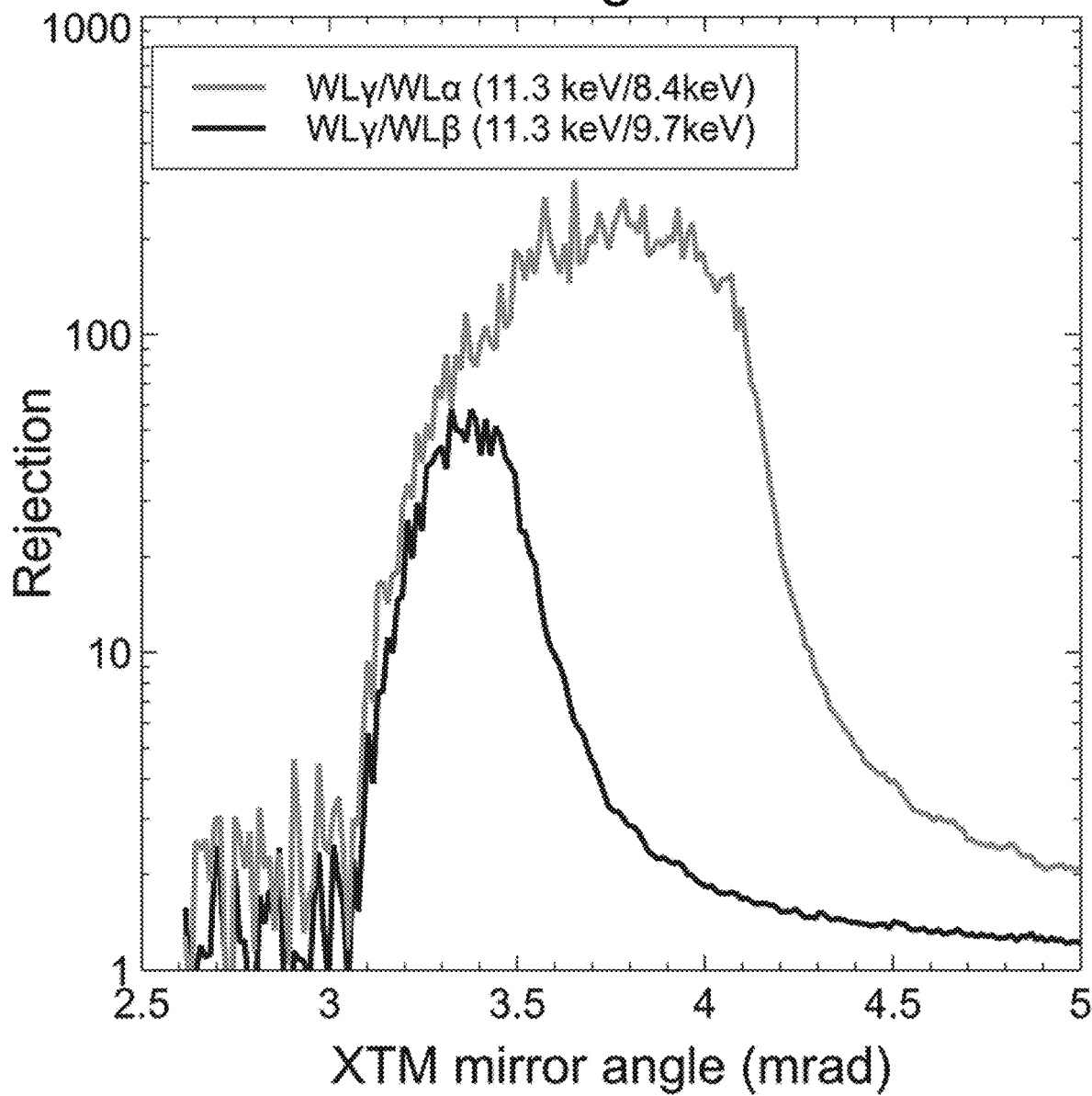
FIG. 10 illustrates FIG. ratios of the transmitted beam from the high-pass x-ray filter device at two different energies.
Figure 11:
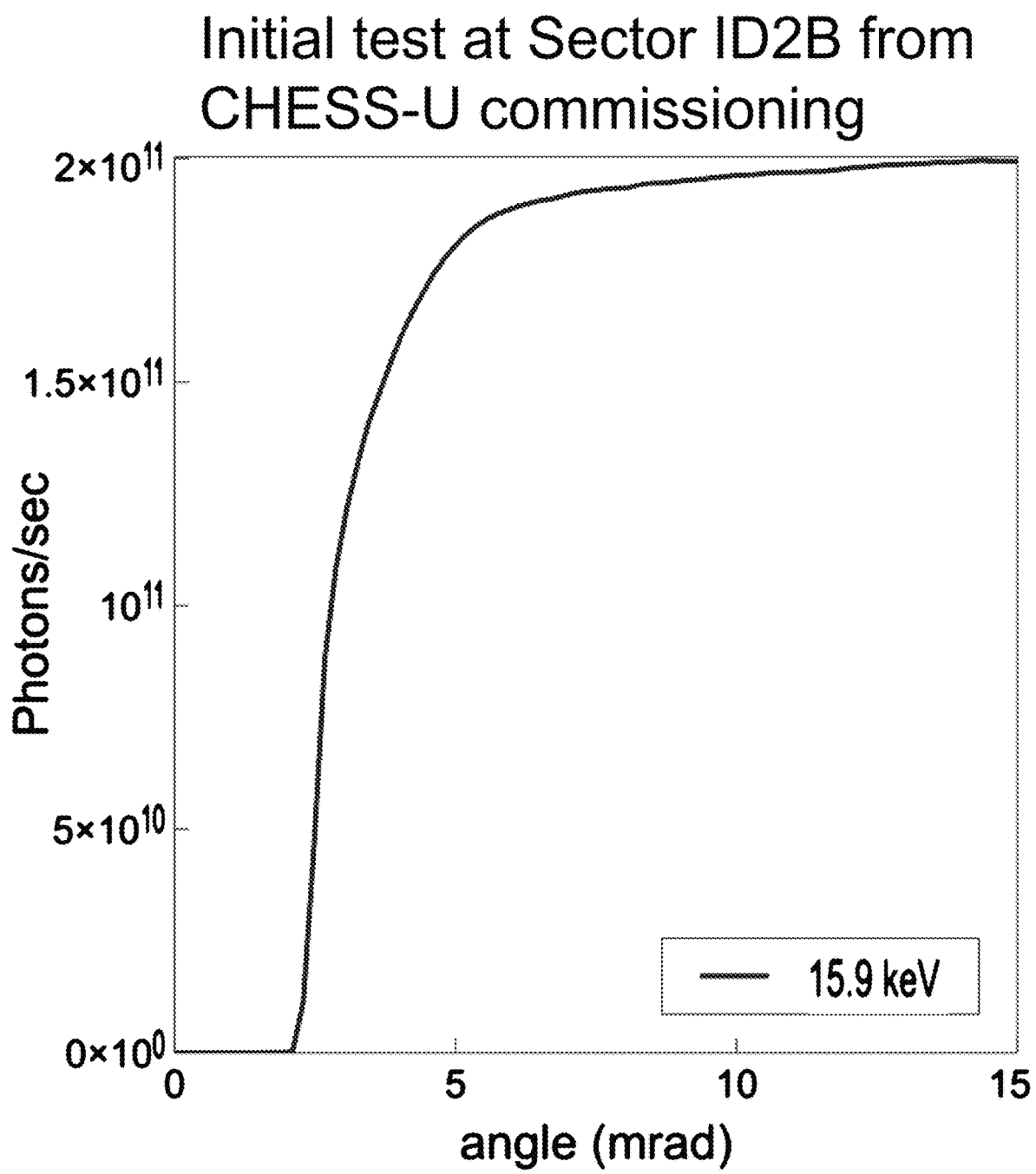
FIG. 11 is a graph of the photons/sec of the transmitted beam versus the angle of the high-pass x-ray filter device.

FIGS. 9A-11 show experimental results for an experimental setup using high-pass x-ray filter device 10, such as shown in FIG. 3. FIG. 9A illustrates the spectral response of the x-ray filter. FIG. 9B is a graph of intensity for the transmitted emissions from the x-ray filter versus the angle of the optics. The x-ray filter is tunable based on the angular position of the optics. FIG. 10 illustrates the ratios of the transmitted beam at two different energies. FIG. 10 illustrates that the critical angle is energy dependent, which creates a tunable range for the x-ray filter. FIG. 11 is a graph of the photons/sec of the transmitted beam versus the angle of the filter.

Although preferred embodiments have been depicted and described in detail herein, it will be apparent to those skilled in the relevant art that various modifications, additions, subtractions, and the like can be made without departing from the spirit of the invention and these are therefore considered to be within the scope of the invention as defined in the claims that follow.

What is claimed is:

1. A high-pass x-ray filter comprising:
   a substrate defining an elongated opening; and
   a reflecting membrane positioned across the opening and supported, along all sides, by the substrate, the reflecting membrane configured to transmit, from an incident x-ray beam, x-ray photons having an energy above about a threshold energy level and to reflect, from the incident x-ray beam, x-ray photons having an energy below about the threshold energy level, wherein the elongated opening of the substrate defines an exit path for the transmitted x-ray beam.

2. The high-pass x-ray filter of claim 1, wherein the substrate comprises a silicon wafer.

3. The high-pass x-ray filter of claim 2, wherein the reflecting membrane comprises a film formed on at least a second side of the silicon wafer.

4. The high-pass x-ray filter of claim 3, wherein the thin reflecting membrane comprises $Si_3N_4$.

5. The high-pass x-ray filter of claim 4, wherein the elongated opening in the substrate comprises an etched window in the substrate from a first side of the substrate to a $Si_3N_4$ layer formed on the second side of the substrate.

6. The high-pass x-ray filter of claim 3, wherein the thin reflecting membrane comprises polymethyl methacrylate (PMMA), SU-8, Parylene C or a poly(p-xylylene) polymer.

7. The high-pass x-ray filter of claim 6, wherein the elongated opening in the substrate comprises an etched window in the substrate from a first side of the substrate to the thin reflecting membrane formed on the second side of the substrate.

8. The high-pass x-ray filter of claim 1, wherein a thickness of the thin reflecting membrane is between about 10 nm to about 600 nm.

9. The high-pass x-ray filter of claim 8, wherein a thickness of the thin reflecting membrane is between about 200 nm to about 400 nm.

10. The high-pass x-ray filter of claim 1, wherein the elongated opening is between about 0.5 mm to about 10 mm in width.

11. The high-pass x-ray filter of claim 1, wherein the elongated opening is between about 70 mm to about 300 mm in length.

12. The high-pass x-ray filter of claim 1, wherein the elongated opening is between about 1.0-2.0 mm in width and is between about 250-300 mm in length.

13. The high-pass x-ray filter of claim 1, wherein the thin reflecting membrane comprises a composite structure.

14. The high-pass x-ray filter of claim 13, wherein the thin reflecting membrane comprises a thin film of a metal coating.

15. The high-pass x-ray filter of claim 14, wherein the thin film of a metal coating is about 10 nm thick.

16. The high-pass x-ray filter of claim 1, wherein the substrate defines a plurality of elongated openings, each of the plurality of elongated openings including a thin reflecting membrane positioned across the respective opening and supported, along all sides, by the substrate, each of the thin reflecting membranes to transmit, from an incident x-ray beam, x-ray photons having an energy above about a threshold energy level and to reflect, from the incident x-ray beam, x-ray photons having an energy below about the threshold energy level, wherein each of the plurality of elongated openings defines an exit path for the transmitted x-ray beam.

17. The high-pass x-ray filter of claim 16, wherein each of the thin reflecting membranes is different than other ones of the thin reflecting membranes.

18. A high-pass x-ray filter system, comprising:
a synchrotron source configured to generate an x-ray beam; and
an x-ray filter including a substrate defining an elongated opening and including a thin reflecting membrane positioned across the opening so as to be supported along all sides by the substrate, the reflecting membrane configured to transmit, from an incident x-ray beam of the synchrotron source, xray photons having an energy above about a threshold energy level and to reflect, from the incident xray beam, x-ray photons having an energy below about the threshold energy level, the elongated opening of the substrate defining an exit path for the transmitted x-ray beam.

19. The high-pass x-ray filter system of claim 18, wherein the synchrotron source includes insertion device magnets.

20. The high-pass x-ray filter system of claim 19, wherein the insertion device magnets comprise an undulator.

21. The high-pass x-ray filter system of claim 20, wherein the x-ray beam generated by the undulator comprises a narrow-band fundamental harmonic and a series of higher energy harmonics.

22. The high-pass x-ray filter system of claim 18, wherein the incident x-ray beam comprises a broadband x-ray spectrum.

23. The high-pass x-ray filter system of claim 18, wherein the thin reflecting membrane is configured to reflect x-ray photons with energies below a critical angle of incidence from the incident x-ray beam.

24. The high-pass x-ray filter system of claim 18, wherein the incident x-ray beam is at a grazing angle relative to the thin reflecting membrane, the grazing angle being between about 0° to about 0.5°.

* * * * *